United States Patent
Angerer et al.

(10) Patent No.: US 6,398,299 B1
(45) Date of Patent: Jun. 4, 2002

(54) MOTOR VEHICLE SEAT WITH A BACK REST

(75) Inventors: Siegfried Angerer, Friedberg; Burkhard Becker; Rainer Frohnhaus, both of Solingen, all of (DE)

(73) Assignee: C. Rob. Hammerstein GmbH & Co. (DE)

( * ) Notice: Subject to any disclaimer, the term of this patent is extended or adjusted under 35 U.S.C. 154(b) by 0 days.

(21) Appl. No.: 09/677,727

(22) Filed: Oct. 2, 2000

(30) Foreign Application Priority Data

Oct. 27, 1999 (DE) ......................... 199 51 820

(51) Int. Cl.[7] ..................... B60N 2/427; B60R 21/00
(52) U.S. Cl. ...................... 297/216.12; 297/216.13
(58) Field of Search ................ 297/216.12, 216.13, 297/216.1

(56) References Cited

U.S. PATENT DOCUMENTS

| | | | |
|---|---|---|---|
| 3,838,870 A | * 10/1974 | Hug | 297/216.12 X |
| 5,290,091 A | * 3/1994 | Dellanno et al. | 297/216.12 X |
| 5,823,619 A | * 10/1998 | Heilig et al. | 297/216.12 |
| 5,833,312 A | * 11/1998 | Lenz | 297/216.13 |
| 6,019,424 A | * 2/2000 | Ruckert et al. | 297/216.13 X |
| 6,135,561 A | * 10/2000 | Kruger et al. | 297/216.13 X |
| 6,213,548 B1 | * 4/2001 | Van Wynsberghe et al. | 297/216.12 |

* cited by examiner

Primary Examiner—Peter M. Cuomo
Assistant Examiner—Rodney B. White
(74) Attorney, Agent, or Firm—Akerman Senterfitt

(57) ABSTRACT

The vehicle seat has a seat pan and a seat back. The seat back is provided with a seat back carrier, a padding body arranged on the seat back carrier and a headrest fastened on the seat back carrier. An upper shoulder area of the padding body, which is adjacent to the headrest, is provided with a normal disposition to yield to the load of a passenger's back. This disposition to yield increases considerably in case of an acceleration due to an accident.

10 Claims, 4 Drawing Sheets

MOTOR VEHICLE SEAT WITH A BACK REST

Figure 1:
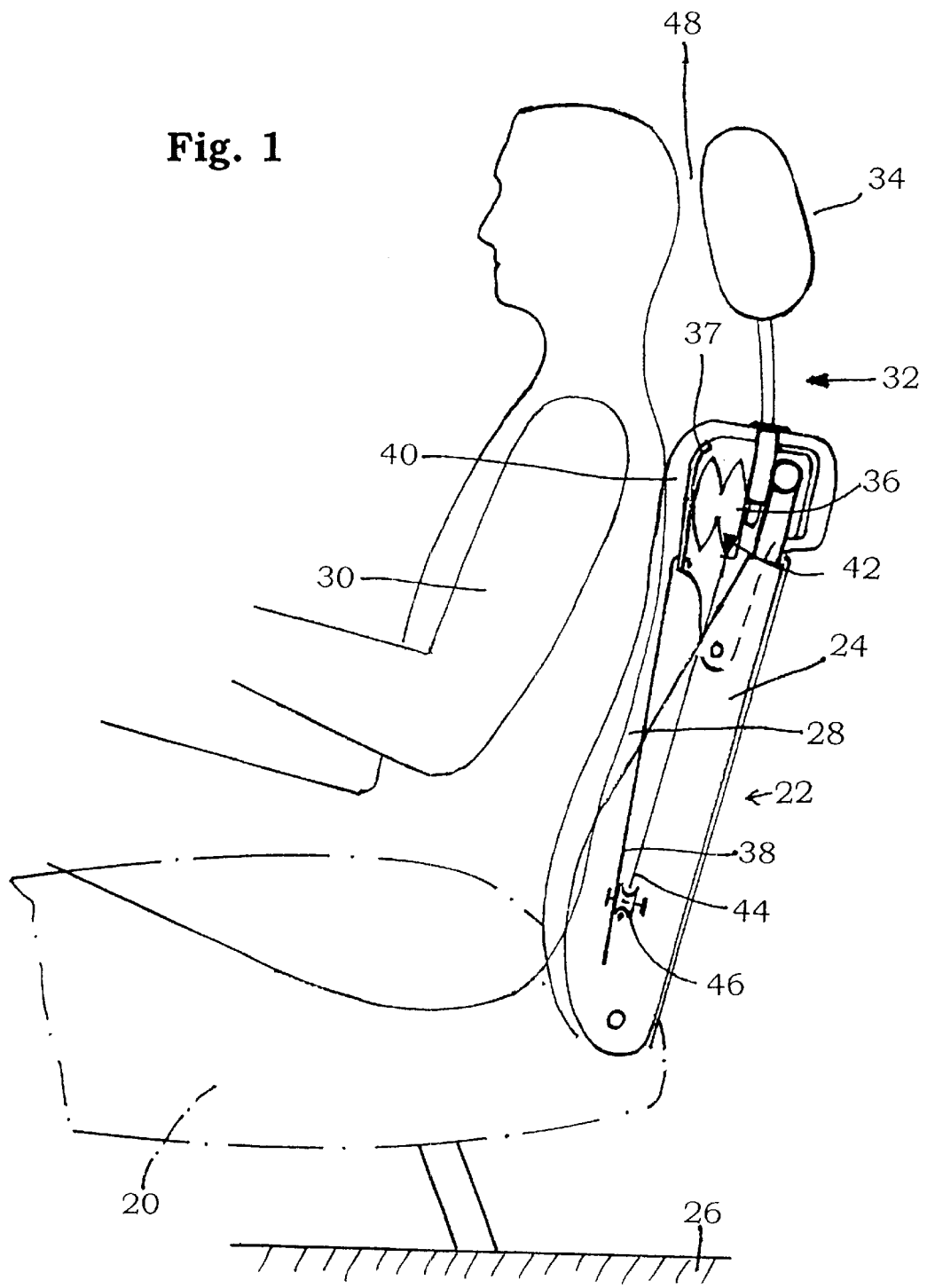

The invention relates to a vehicle seat for an automotive vehicle, wherein the vehicle seat has a seat pan and a seat back, said seat back being provided with a) a seat back carrier, b) a padding body arranged on said seat back carrier and c) a headrest fastened on said seat back carrier.

When a passenger is sitting in a normal posture, its back rests on the padding body. The head of a passenger is generally located somewhat in front of a headrest cushion of the headrest, the distance between head and cushion typically amounting to several centimeters. Irrespective of the exact dimension of this distance however, a clear space intervenes between the head of many passengers and the headrest cushion of the headrest.

A distance between the headrest cushion and the head of a passenger however has adverse consequences in the event of a rear crash of the vehicle. If for example another vehicle collides into the back of the considered automotive vehicle, the automotive vehicle in question is pushed forward while the passenger in the first place remains still as an inert mass. As a result, the padding body moves toward the back of the passenger together with the headrest carried by the seat back carrier. Consequently, the head of the passenger moves backward until it gets in touch with the headrest cushion. This specific movement often causes ailments or even injuries like for example a so-called whiplash.

It has already been tried to design vehicle seats in such a way that the headrest moves forward in the event of a rear crash. These solutions do not always lead to favorable results.

On the basis of these premises, the object of the present invention is to develop a vehicle seat of the type mentioned above in such a manner that, in the event of a rear crash, a rearward movement of the head relative to the back is possibly avoided and that even in case the head is located at some distance from the headrest cushion of the headrest, head and back are almost simultaneously intercepted in case of acceleration due to an accident, without the head being moved rearward.

Footing on the vehicle seat of the type mentioned above, the solution of this object is to, on one side, provide an upper shoulder area of the padding body, which comes next to the headrest, with a normal disposition to yield to the load of a passenger's back in the case of a normal automotive vehicle, this disposition to yield increasing considerably on the other side in case of an acceleration of the automotive vehicle brought about by an accident and exceeding a threshold value, so that the thickness of the shoulder area is considerably smaller under the load of a passenger's back than when it has its normal disposition to yield.

In the event of a rear crash and in accordance with the invention, the harmful effect of a clear space between the head of a passenger and the headrest cushion is prevented by the fact that the upper area of the padding body becomes very soft in case of an accident, so that the back may immerse more deeply into the seat back and that it is only intercepted when the head comes to lie on the headrest cushion. Accordingly, at least the upper area of the padding body has two different dispositions to yield into which it may be brought on purpose. In the normal condition of the automotive vehicle, this upper area, which is also called shoulder area, has a resilience that is standard for use. This resilience complies with the padding quality of standard vehicle seats. In the event of a rear crash, the disposition to yield is abruptly altered, the shoulder area becomes very soft, under the load of a passenger the thickness of the shoulder area may now be considerably reduced relative to its normal disposition to yield. Thus, the back of a passenger may now move farther to the back toward the seat back carrier. If the additional path the back has now at its disposal thanks to the now soft shoulder area equals the distance between head and headrest cushion that was given before the accident occurred, no relative motion between head and trunk takes place, so that a whiplash of the head rearward does not occur. Said additional path may also be greater than the distance mentioned, it should not be smaller, though. The change in the disposition of the shoulder area to yield only takes place above a threshold value of the acceleration of the automotive vehicle. This threshold value is detected by appropriate means. It may for example be determined by detecting devices as they are used for belt tighteners, air bags and so on. It may also be acquired by the relative motion of the passenger relative to the seat back. In the event of a rear crash, the lower part of the passenger's back also plunges into the seat back, so that this motion may be used to activate the change in the disposition to yield of the shoulder area.

Experience tells that the clear space between the head and the headrest cushion of a headrest usually amounts to approximately 40 mm. This is the measurement by which the thickness should be reduced by the controlled change in the disposition to yield. When the padding body is switched to its soft condition, the thickness of the shoulder area should at least be reduced by 30, preferably by at least 40 mm compared to the thickness of the padding body in its normal condition.

The shoulder area preferably is provided with a supporting part, which is connected to the seat back carrier and which influences and in particular determines the disposition to yield of the shoulder area. This supporting part has a first, normal condition as long as the threshold value of acceleration due to an accident of the vehicle has not been attained. As soon however as this threshold value is attained and exceeded, the supporting part adopts a second condition. In this second condition, it defines a considerably higher disposition to yield of the shoulder area.

In the preferred embodiment, the supporting part is configured either as a mechanical supporting yoke or as an inflated headrest cushion.

In the first case, the supporting yoke is hinged to the seat back carrier and can be brought from a position, in which it is farther away from the seat back carrier into a position, in which it is nearer to the seat back carrier. As a result, reducing the thickness of the shoulder area thus becomes possible in the event of an accident.

The thickness of the shoulder area is not reduced automatically, but rather by the fact that the passenger moves relative to the seat back.

In a preferred embodiment, an elastic means is provided, which pretensions the supporting part in the first, normal condition. The normal disposition to yield of the shoulder area is determined by this means as well. It is also possible that, in case of an operating error, the supporting part returns to its normal position on its own.

A locking device with a movable locking part is preferably provided, said locking part mechanically securing the supporting part in the first condition. The locking part becomes inefficient and no longer secures the supporting part when the acceleration exceeds the threshold value. The motion of the locking part may be controlled by the means already described herein above, like for example by the trigger unit of an air bag or by a very strong motion of a passenger's bottom into the seat back.

A decisive advantage of the invention is that the headrest is directly assigned to the seat back carrier and that the forces acting upon the headrest are directly transmitted into the seat back carrier and thus into a seat underframe.

Further advantages and characteristics of the invention will become apparent from the remaining claims and the following description of embodiments that are only examples and are not limiting the scope of the invention, whereas said embodiments are explained in more detail with the aid of the drawing.

Figure 2:
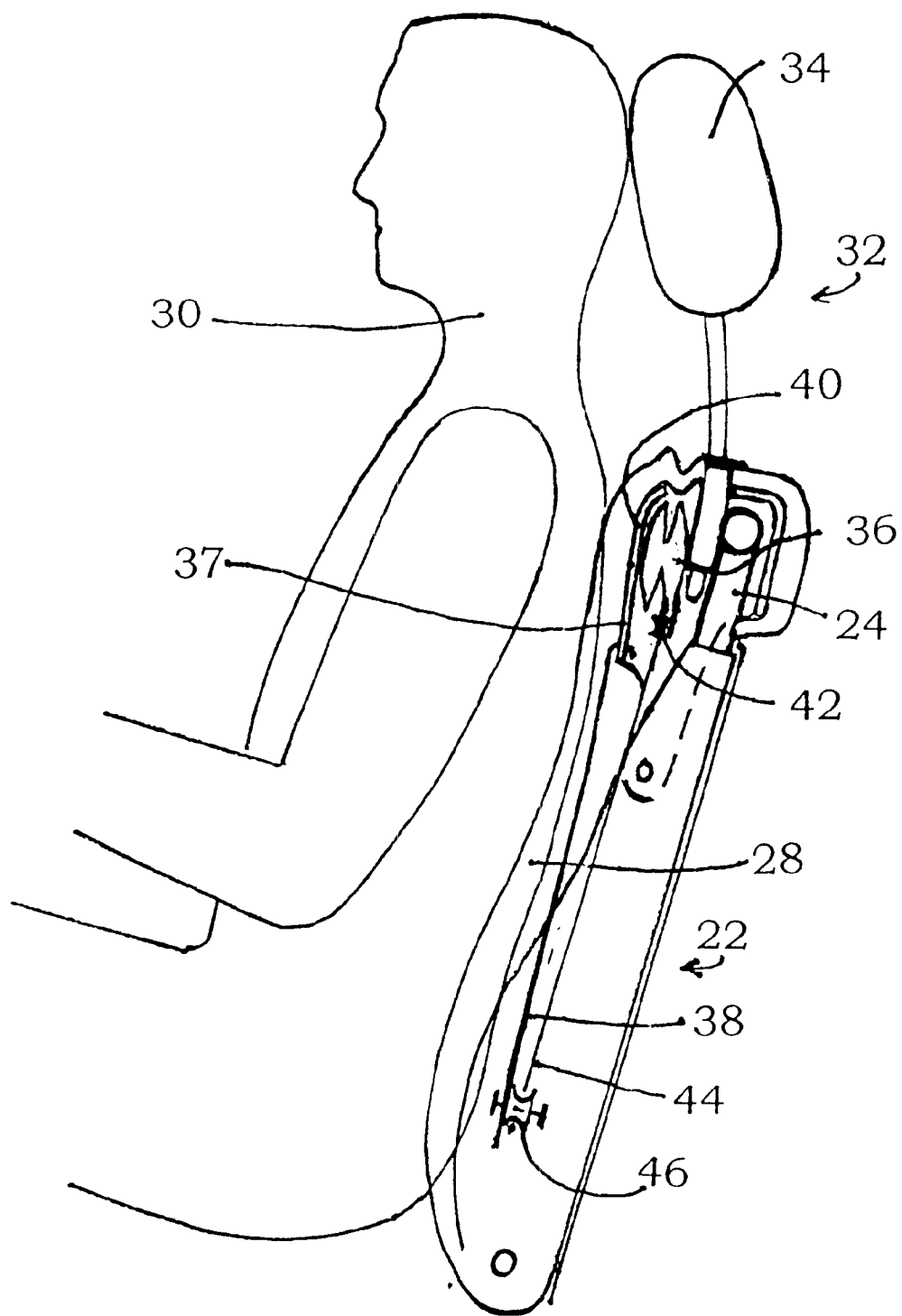
Figure 3:
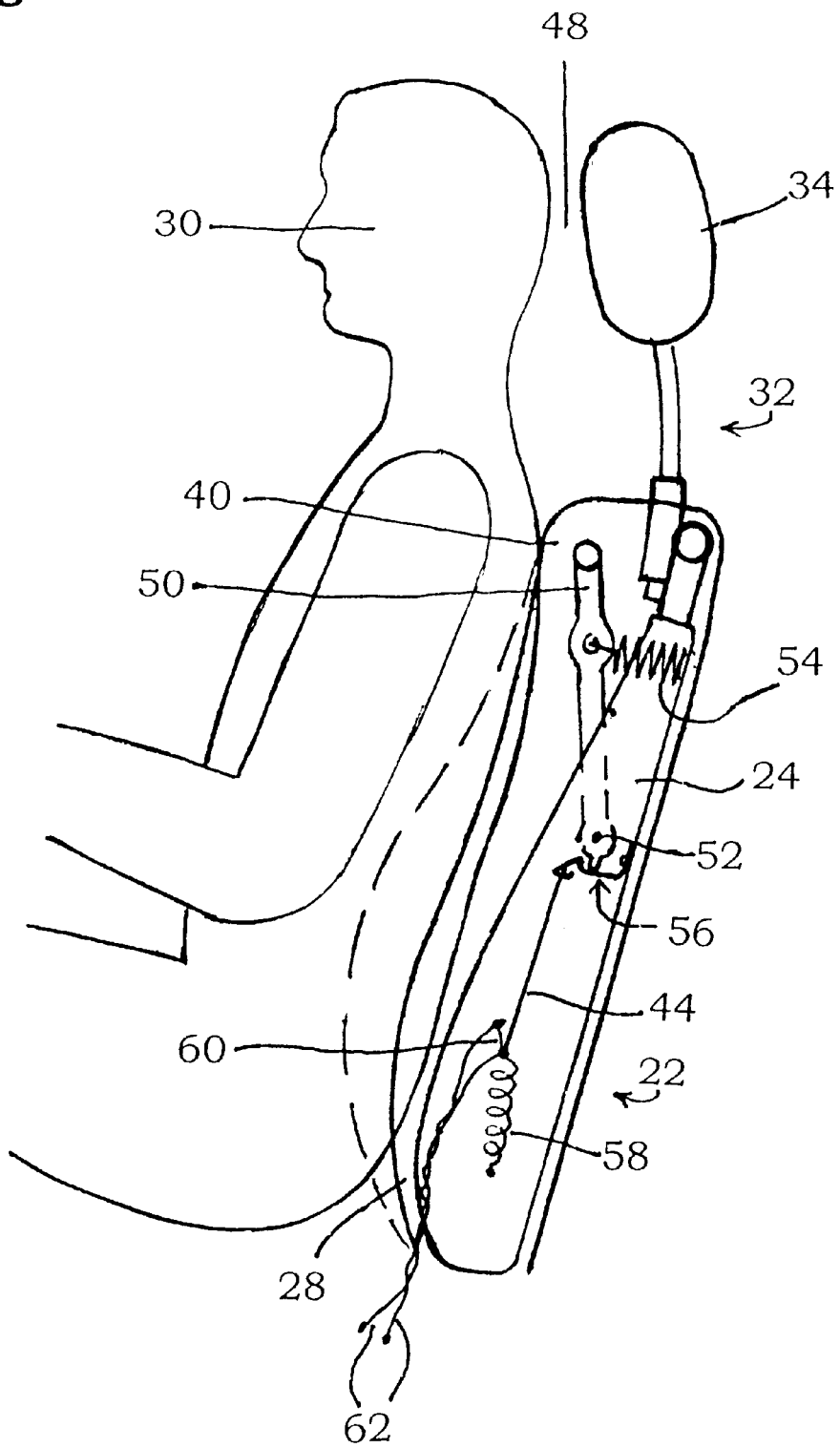
Figure 4:
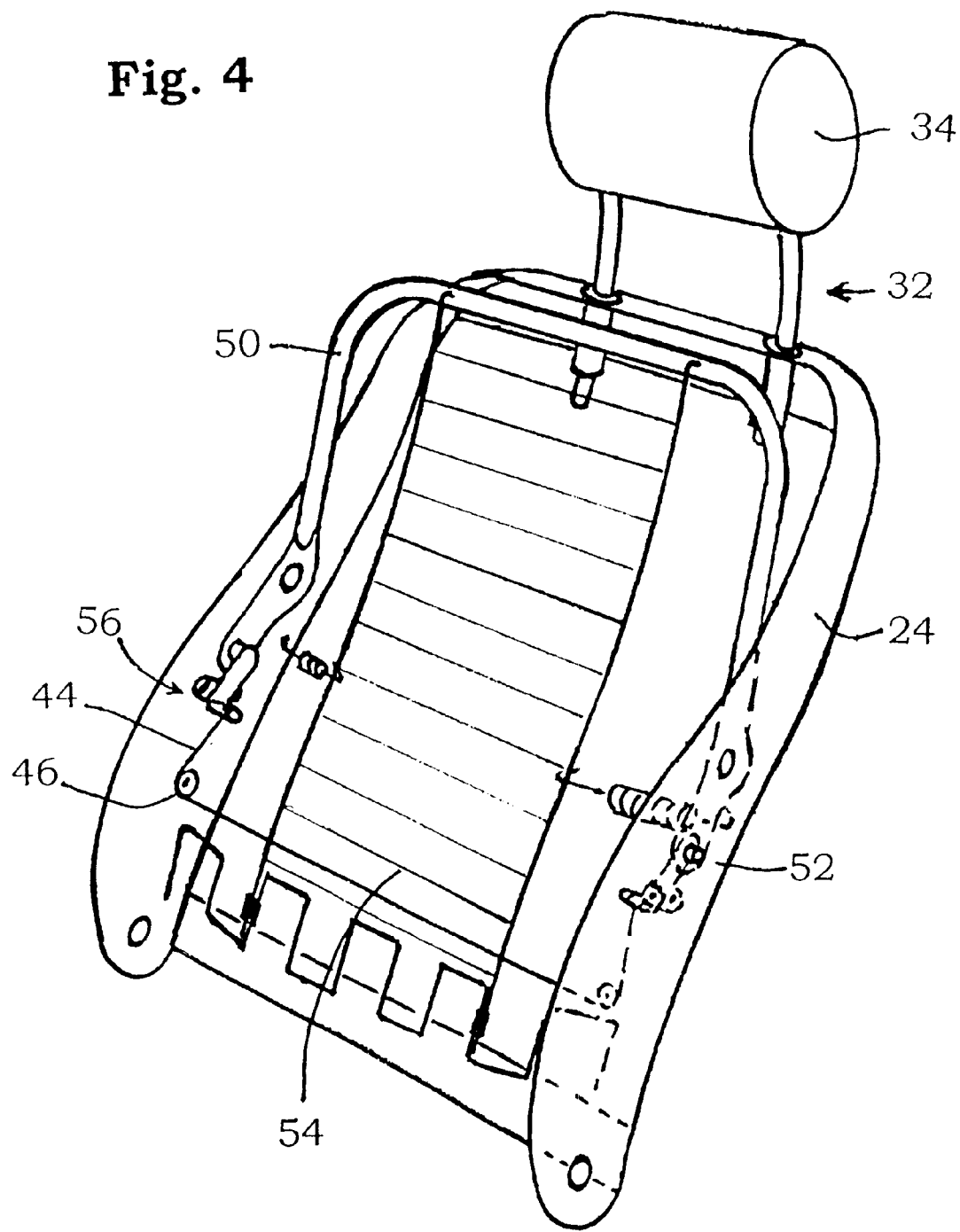

FIG. 1: shows a side view of a vehicle seat (in part) with a passenger (drawn in part) sitting on said vehicle seat, the automotive vehicle being in its normal condition and the shoulder area of the seat back having its normal disposition to yield, FIG. 2: shows an illustration of the substantial elements of FIG. 1, the automotive vehicle being now in a condition brought about by an accident, wherein the shoulder area now has a thickness which is considerably reduced compared to the normal condition, the head of the passenger resting on the headrest cushion, FIG. 3: shows an illustration similar to FIG. 1, but now for another embodiment of a supporting part in the seat back and FIG. 4: shows a perspective illustration of a seat back without a padding body.

The first embodiment in accordance with the FIGS. 1 and 2 shows a vehicle seat with a seat pan 20 and a seat back 22. The seat back 22 has a seat back carrier 24. Said seat back carrier defines shape and firmness of the seat back. It is conventionally connected at the bottom with a seat carrier of the seat pan 20 by way of an adjustable pivoting connection.

The seat pan 20 is connected to an underbody 26 of the automotive vehicle by way of connecting elements that have only been schematically sketched in the drawing herein.

The seat back 22 also has a padding body 28 which is carried by the seat back carrier 24 and which is located on the front side, that is on the side of the seat back that faces the passenger 30. By padding body, the overall upholstery is meant. Typically, it has a cover, a layer of foam, springs and a hollow space. Finally, a headrest 32 provided with beams and a headrest cushion 34 is attached to the seat back carrier 24.

The FIGS. 1 and 2 are sectional views of the seat back 22. In an upper area of the seat back that extends downward from the upper edge of the seat back and constitutes about ⅓ up to the half of the overall back length, a supporting cushion 36 is accommodated to serve as supporting part. It is located between the seat back carrier 24, between part of it at least, and a front hinge support 37. It substantially accounts for the disposition to yield of the upper area of the seat back. This upper seat back area will be referred to as shoulder area 40 hereinafter.

In the illustration of FIG. 1 the supporting cushion is inflated, the shoulder area 40 has its normal thickness measured in the driving direction of the automotive vehicle. The supporting cushion is closed, a valve body 42 seals it from the outside. By way of a tension element 44, said valve body 42 is connected to a lower roller 46, there the tension element is turned round and guided to the other side fo the seat back carrier 24. It is fastened there.

In the event of a rear crash, the seat back is pushed toward the passenger, the back of the passenger plunges deeper into the seat back. This motion tightens the tension element. The thus provoked tension in the tension element effects that the valve body is released from its sealing seat and that the supporting cushion 36 is now open. The air it contains may now flow out. It gets to flow out by the fact that the seat back moves toward the passenger in the upper area as well. The shoulder area 40 is not as firm as it was in accordance with FIG. 1, it is now considerably more disposed to yield. It deforms under the passenger's load, as can be seen in FIG. 2 and has, as a result, a reduced thickness. The supporting cushion 36 is largely folded up. A fold is shown on the upper edge of the seat back.

The condition in accordance with FIG. 2 is achieved when an acceleration value occasioned by an accident is given. In that case, the shoulder area 40 becomes so disposed to yield that it may be compressed to the reduced thickness with hardly any force. As a comparison between the FIGS. 1 and 2 shows, the position of the head relative to the trunk may remain unchanged when, in the event of an accident, the seat back moves against the passenger, which is inertly abiding.

While in the normal condition as it is illustrated in FIG. 1, there is a clear space 48 between the head of a passenger and the headrest cushion 34, this is no longer the case in the condition brought about by an accident in accordance with FIG. 2. Due to the virtual forceless disposition to yield of the shoulder area 40, the back and head of the passenger are supported in the relative position to one another they also had in the normal condition in accordance with FIG. 1. As a result, the head does not move backward relative to the trunk.

In the embodiment according to FIG. 3, the supporting part is constituted by an essentially U-shaped supporting yoke 50 that is hinged on hinge points 52 by its lower, free ends to the seat back carrier 24. These hinge points 52 are approximately located halfway up the seat back 22. The supporting yoke 50 is located within the shoulder area 40 of the seat back 22. Together with the seat back carrier 24 it forms a Y. The supporting yoke is pretensioned by a pressure spring 54 in a position, in which it is at the greatest distance from the seat back carrier 24, as it is illustrated in FIG. 3. This position of the supporting yoke 50 is secured by a locking device 56. Said locking device 56 has a leaf spring bent to form a ratchet, which, by a steep projection, prevents a catch accommodated on the supporting yoke 50 and projecting downward from moving to the left, i.e., the supporting yoke 50 from approaching the seat back carrier 24 in its upper area.

The locking device 56 is connected with a tension element 44, which is for his part connected with a tension spring 58 that is fastened at its other end on the seat back carrier 24. Said tension spring 58 is designed for releasing the locking device 56 by pulling it via the tension element 44. A retaining wire 60 however prevents it from doing so, said wire engaging in the upper end of the tension spring 58 and resting at its other end on the seat back carrier 24. Said retaining wire 60 is connected on both of its ends to electric lines 62. If a certain voltage is applied on said lines, the retaining wire 60 burns out. Then, the tension spring 58 is capable of disabling the locking device 56 by way of the tension element 44 so that, at the slightest pressure exerted against the shoulder area 40, said area may deflect with virtually no force and adopt a condition of reduced thickness as it is shown in FIG. 2.

The locking device 56 has a leading slope. In case of operating errors, the supporting yoke 50 is capable of reintegrating by himself the position shown in FIG. 3 under the action of its tension spring 54.

The padding body has a superficial foam layer and beneath said layer, the supporting part. A flat spring preferably acts upon a transverse base part of the supporting yoke 50, said spring constituting the spring system and being located directly underneath the foam layer. The connecting line of its ends on the base and in the lower area of the seat back carrier 24 runs in front of a connecting line of the hinge points 52 so that the flat spring performs the function of the pressure spring 54, which consists in elastically pretensioning the supporting yoke 50 away from the headrest 32.

In this connection, reference is also made to the embodiment according to FIG. 4. Its constructional design is similar to the one of the embodiment of FIG. 3. The locking device 56 however is in this case purely mechanical and its design is similar to the one of the first embodiment according to the FIGS. 1 and 2. In fact it has one locking part on either side of the seat back carrier 24. The two locking parts are joined together by way of a tension element 44 that runs across the axis for the pitch adjustment of the seat back and slightly above said axis. In this respect, the conditions are similar to those of FIGS. 1 and 2.

What is claimed is:

1. A vehicle seat for an automotive vehicle, wherein said vehicle seat has a seat pan and a seat back, said seat back comprising:
    a seat back carrier;
    a padding body arranged on said seat back carrier; and
    a headrest fastened on said seat back carrier;
    wherein said padding body comprises an upper shoulder area adjacent to the headrest;
    wherein said padding body has a disposition to yield to a load of a passenger's back;
    wherein said upper shoulder area is provided with means to modify said disposition to yield between a normal disposition to yield to the load of a passenger's back when the vehicle is in a non-accident situation, and a considerably increased disposition to yield when the vehicle is accelerated due to an accident, whereby the thickness of the shoulder area is considerably smaller under the load of a passenger's back during the increased disposition to yield than during the normal disposition to yield.

2. Vehicle seat according to claim 1, wherein the thickness of the shoulder area is reduced by approximately 30 mm, compared to the thickness given when in a normal disposition to yield.

3. Vehicle seat according to claim 1, wherein the shoulder area is provided with a supporting part;
    wherein the supporting part is connected to the seat back carrier and influences the disposition to yield of the shoulder area; and
    wherein said supporting part, controlled by a first, normal condition, in which it determines the normal disposition to yield of the shoulder area, adopts, upon exceeding a threshold value, a second condition, in which it determines the considerably higher disposition to yield of the shoulder area.

4. Vehicle seat according to claim 3, wherein the supporting part is a supporting yoke that is arranged on, and in particular hinged to the seat back carrier.

5. Vehicle seat according to claim 3, wherein the supporting part is a supporting cushion that rests on the seat back carrier and that is inflated and closed in its first condition, whereas in its second condition it is open so that the air may flow out upon pressure exerted onto the supporting cushion.

6. Vehicle seat according to claim 3, wherein an elastic means is provided that pretensions the supporting part in the first, normal condition.

7. Vehicle seat according to claim 3, wherein a locking device with a movable locking part is provided, said locking part mechanically securing the supporting part in the first condition, but becoming inefficient when the acceleration exceeds the threshold value.

8. Vehicle seat according to claim 7, wherein the locking device is provided with a trigger unit, which is connected to the locking part and brings said locking part into a releasing position when the acceleration exceeds the threshold value.

9. Vehicle seat according to claim 7, wherein the locking device is connected to an electronic device for detecting an acceleration, to a device designed to control an air bag for example.

10. Vehicle seat according to claim 1, wherein the thickness of the shoulder area is reduced by approximately 40 mm, compared to the thickness given when in a normal disposition to yield.

* * * * *